United States Patent [19]

Jebens

[11] Patent Number: 4,799,778
[45] Date of Patent: Jan. 24, 1989

[54] FRESNEL LENS CONCENTRATOR

[75] Inventor: Robert W. Jebens, Skillman, N.J.

[73] Assignee: General Electric Company, Fairfield, Conn.

[21] Appl. No.: 849,437

[22] Filed: Apr. 8, 1986

[51] Int. Cl.$^4$ .............................................. G02B 3/08
[52] U.S. Cl. ................................... 350/452; 126/440; 136/246; 350/437
[58] Field of Search ................ 350/452, 437; 136/246; 126/440

[56] References Cited

U.S. PATENT DOCUMENTS

| | | | |
|---|---|---|---|
| 2,588,373 | 3/1952 | Erban | 350/28.93 |
| 3,020,395 | 2/1962 | Peltz | 350/452 |
| 3,203,306 | 8/1965 | Lefferts | 350/1 |
| 3,915,148 | 10/1975 | Fletcher et al. | 126/271 |
| 3,991,741 | 11/1976 | Northrup, Jr. et al. | 126/271 |
| 4,050,782 | 9/1977 | Uchida et al. | 350/96 |
| 4,103,673 | 8/1978 | Woodworth et al. | 126/271 |
| 4,134,393 | 1/1979 | Stark et al. | 126/271 |
| 4,165,734 | 8/1979 | Schmidt | 126/424 |
| 4,282,858 | 8/1981 | Bowers, Jr. | 126/425 |
| 4,312,330 | 1/1982 | Holdridge | 350/452 |

OTHER PUBLICATIONS

James et al., "Fresnel Optics for Solar Concentration on Photovoltaic Cells", 13th IEEE Photovoltaic Specialists Conference, June 5–8, 1978.

Burgess et al., "One Kilowatt Photovoltaic Subsystem using Fresnel Lens Concentrators", 12th IEEE Photovoltaic Specialists Conference, Nov. 15–18, 1976.

Primary Examiner—John K. Corbin
Assistant Examiner—Rebecca D. Gass
Attorney, Agent, or Firm—T. H. Magee

[57] ABSTRACT

The Fresnel lens concentrator is formed by a specially designed Fresnel lens and a solar cell located on the axis of the lens at its focal plane. The lens is designed so that its central facets project the light from the sun towards the outer periphery of the cell and facets progressively toward the periphery of the lens project light progressively toward the center of the cell to obtain a uniform distribution of light on the cell. Adjacent groups of facets of the lens project the light alternately in front and beyond the cell to maintain a constant light intensity for a certain depth of focus of the lens.

10 Claims, 1 Drawing Sheet

FRESNEL LENS CONCENTRATOR

This invention relates to a new Fresnel lens design for solar concentrators.

BACKGROUND OF THE INVENTION

The usual procedure in solar concentrators is to use a standard type Fresnel lens designed for point focus and to place the target inside of focus to obtain the desired concentration ratio and to slightly modify the lens facet angles to improve the uniformity of the intensity. There are three problems with this design approach which are particularly noticeable for photovoltaic concentrator arrays where one wants to use minimum size cells.

First, the image of the sun projected on the target has poorly defined boundaries because (assuming the lens is circular) they are formed by the rays mainly passing through the edge portion of the lens. The outer rays are more poorly defined at the target plane than the central rays due to the greater spread from dispersion and facet imperfections. These outer rays also have a longer path length giving rise to a larger spread due to the finite angle (one half degree) the sun subtends.

The second problem is that the sharpness of the boundaries and the concentration ratio are very sensitive to the separation of the target from the lens due to the large aperture of such lens designs.

The third problem involves the typical situation that the lenses of the concentrator are square or polygon shaped and the rays outside the inscribed circle which amount to about 21% of the total square surface, cannot be mapped neatly into the typical target.

SUMMARY OF THE INVENTION

The new Fresnel lens, is formed of concentric facets which project the image of the sun onto a target, e.g., a photoelectric cell.

The central rays are directed towards the outer periphery of the cell and the rays passing through the outer periphery of the lens are directed towards the center of the cell. Intermediate facets of the lens of decreasing radius project the sun light according to a progressively increasing radius on the target which is the cell. A uniform distribution of the light on the target is obtained by apportioning the light passing through consecutive groups of facets to fall on different ring-like portions of the target. In addition, these groups of facets focus the light partly in front of and partly behind the target to minimize the light variations on the target in the case of small axial displacements of the lens relative to the cell.

DESCRIPTION OF THE PREFERRED EMBODIMENTS

Figure 1:
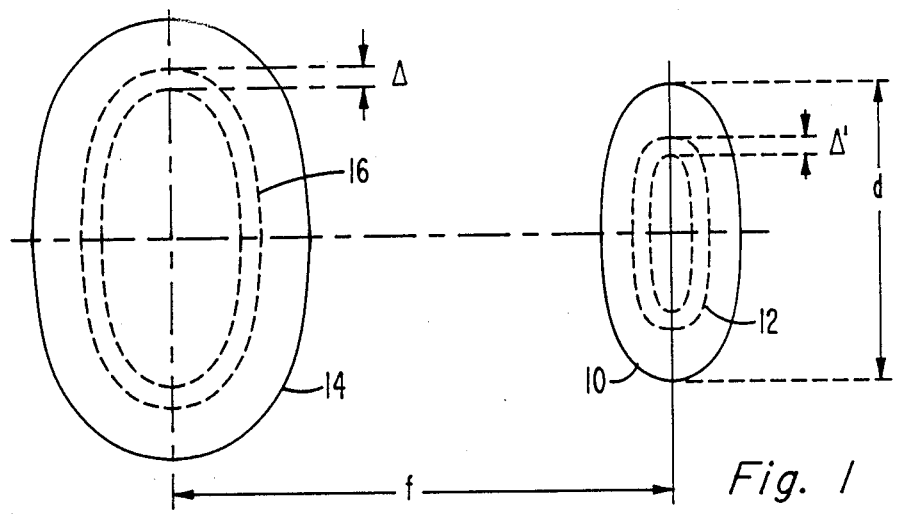
FIG. 1 shows a schematic view of a Fresnel lens with an intermediate facet and a circular target with an intermediate ring.

As illustrated in FIG. 1, a circular target 10 has a diameter d. It is assumed that the target is divided into n' concentric rings, one of which is identified as 12 and has a width $\Delta'$. The innermost of these concentric rings has negligible interior radius. A circular lens 14 of the Fresnel type is divided into successive groups of concentric facets, one of which facets is identified as 16 and has a width $\Delta$. The width $\Delta'$ of the target ring 12 need not be finer than the widths of the Fresnel lens facets. The distance between the lens and the target is f. The area $A_{n'}$ of the n'th ring of the target is $(2n'-1) \Delta'^2 \pi$. The ratio R of the area $A_{n'}$ of the n'th ring to the area $A_T$ of the whole target is as follows:

$$R = \frac{A_{n'}}{A_T} = \frac{\pi(2n'-1)\Delta'^2}{\pi(d/2\Delta')^2 \Delta'^2} = \frac{2n'-1}{(n'_T)^2}$$

wherein $n'_T$ represents the total number of rings.

R represents the fraction of the total light from the lens that should fall on the n'th ring of the target for uniform intensity distribution over the target.

The ratio R will help to determine which part of the lens is used and how it is used to illuminate the n'th ring.

The basic aspect of the invention is to map the light from the center of the lens to the outside of the target and the light from the outside of the lens to the center of the target. This is done in a way so that a portion, e.g., about half, the light falling on a particular target ring crosses the optical axis before reaching the target and the remainder of the light falling on the same target ring does not cross the optical axis before reaching the target. It is assumed here, for simplicity, that the lens is equally efficient all over without reflective or dispersive losses and that the source of light is a point source at infinity (instead of the one-half degree sun source). The group of ring-like facets converging light on the target plane are presumed to have a focal length somewhat different than f. Under these conditions each ring-like facet of width $\Delta$ in the lens produces a ring image on the target of width $\Delta'$. If $\Delta = \Delta'$ then the light from a particular lens facet can be made to fall entirely within the n'th ring on the target.

Figure 2:
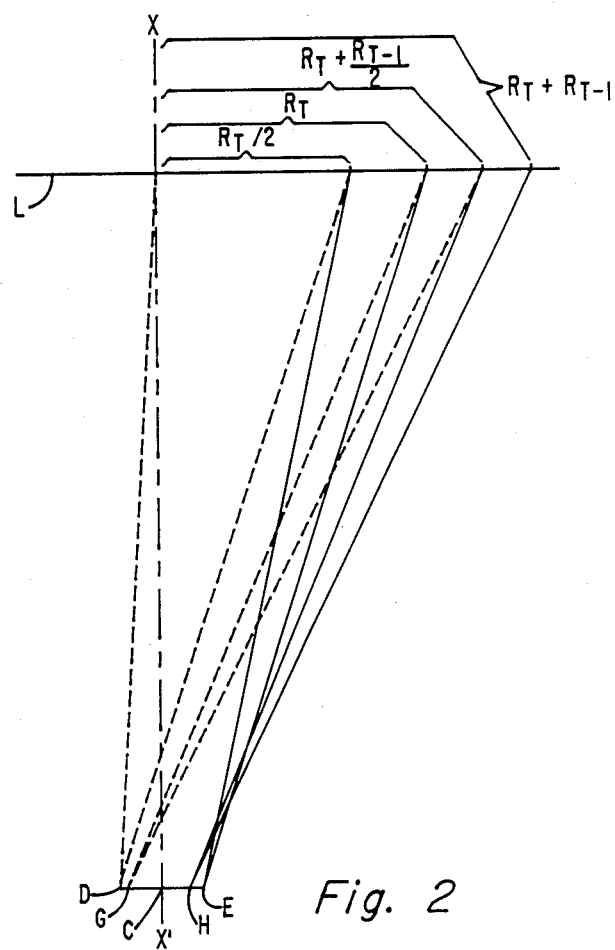
FIG. 2 is a diagrammatic view of the direction of some light beams going from the lens to the target.

FIG. 2 diagrammatically illustrates the direction of some light beams between the lens plane L and the target plane or cell plane C about the optical axis XX'. The outermost target ring $n'_T$ which forms the target boundary will be considered first. Its area ratio is:

$$R_T = \frac{2n'_T - 1}{(n'_T)^2}.$$

Starting with the innermost facet, facet areas are summed up to the nearest whole facet to find the number of central facets required to match one half of the required lens area ratio $R_T$ for the outermost target ring. A first beam formed by these central facets extends from the center of the lens out to a radius corresponding to the area ratio $R_{T/2}$ and lands at D on the outermost ring $n'_T$ of the target. This first beam crosses the optical axis XX' before reaching the target. This choice insures that the central facets will be cut with the same angle sense at the rest of the lens. A second beam is formed by summing up the following facet areas until the whole area required for the area ratio $R_T$ is reached to the nearest whole facet. This second beam extends between the radius corresponding to area ratios $R_T$ and $R_{T/2}$ and lands at E also on the outermost ring of the target but is angled so as not to cross the optical axis before reaching the target.

The illumination of the next innermost target ring $n'_{T-1}$ is found as follows. The area of the facets is summed again until the area ratio values of $R_T + (R_{T-1})/2$ and $R_T + R_{T-1}$ are reached. The third beam is formed by the facets between $R_T$ and $R_T+(R_{T-1})/2$ and is made to cross the optical axis before landing at G on the next to the outermost target ring while the facets between $R_T+(R_{T-1})/2$ and $R_T+R_{T-1}$ forming the fourth beam land at H on the same ring but cross the optical axis beyond the target. This process continues so that each target ring area gets the proper amount of light from the lens through two different beams or bundles of rays, those that cross the optical axis before the target and those that reach the target before crossing the optical axis. This process allows the target to slightly move along the axis XX' relative to the lens without changing the light intensity on the target.

For a circular lens this repartition procedure of the light runs into difficulty near the center of the target because as the target ring area ratio is going down, the area of a facet on the lens is going up. So there is a point where even one facet on the lens provides too much light for the inner target rings producing a hot spot. However, if the lens is squared or made polygonal by removing segments on the edges, then the facets outside the inscribed circle decrease in length as the corners are approached. In fact, the corners of the square almost map into a circle with the corners at the center. Thus this design process can proceed with a polygon shaped lens right to the inner circle of the target having a radius $\Delta'$. If factors such as dispersion, and transmission of the lens as a function of facet angle become important, they may be included in the designing of a practical lens as an area weighting function in the facet summing process.

This design approach yields three valuable results. First, the outer boundary of the target is defined by the best part of the lens, those facets having the least dispersion and beam spreading, so it is much better defined. Second, the size of the target image, the concentration ratio, and the localized non-uniformity represent factors varying very slowly with the target distance. The outside of the image is defined by very small angle rays and is a minimum at the proper target distance and varies very slowly. This is contrary to a conventional lens which has very high angle rays defining the image boundary. With rays crossing the optical axis in reaching the target having substantially the same energy and distribution of energy over the target area as rays reaching the target before being able to cross the optical axis, there is no appreciable change in energy distribution over the target area owing to focussing action as the target is moved. The choice of having half the rays cross over is not critical for minimum variation in intensity with target motion. The rays that cross over ahead of the target arrive at a higher angle than the other rays and thus are more sensitive to target location so in principle, a slightly higher weighting is preferably given to the rays crossing behind the target. This higher weighting is obtained by designing more facets projecting light beyond the target. But as long as the circle of confusion is reasonably uniform inside and outside of proper focus, a satisfactory image is obtained. The third result is that the rays from the corners of the square lens are directed to the center of the target. Since these are generally poorly defined rays due to spreading and dispersion and due to their high angle of incidence, the design is less affected than if these rays were directed to the outside of the target where small errors would make the rays possibly miss the target.

What is claimed is:

1. A Fresnel lens having a central optical axis passing through perpendicularly to the lens plane and comprising a plurality of concentric ring-like facets for converging light onto a target plane through which said central optical axis passes at least substantially perpendicularly to illuminate said target plane in a plurality $n'_t$ in number of concentric ring-like areas about said axis, wherein successive groups of contiguous facets of said lens have respective consecutive ordinal numbers respectively from the center at the optical axis to the periphery of said lens, which successive odd-numbered groups of contiguous facets converge light onto successive ring-like areas of said target plane respectively from the periphery to the center of said target at said axis, which successive even-numbered groups of contiguous facets also converge light onto said successive ring-like areas of said target plane respectively from the periphery to the center of said target, wherein each ring-like area of said target plane receives substantially focussed light passing through a respective group of consecutive ring-like facets, said groups each containing a predetermined number of such facets according to a fraction of the total light as would pass through that group as through the entire leans under conditions of uniform illumination by light parallel to said optical axis so as to maintain a uniform light intensity over the surface of the target plane under such illumination conditions wherein each even-numbered group of said consecutive ring-like facets is arranged to converge its fraction of said light so as not to cross the optical axis before reaching the target plane and wherein each odd-numbered group of said consecutive ring-like facets is arranged to converge its fraction of said light so as to cross the optical axis before reaching the target plane.

2. The Fresnel lens of claim 1, wherein said fraction of the total light from the lens which falls on the n'th ring-like area of the target is represented by the following formula:

$$R \frac{2n'-1}{(n'_T)^2}$$

wherein $n'_T$ represents the total number of ring-like areas.

3. The Fresnel lens of claim 1 where the number of said ring-like facets for converging light to cross the optical axis before reaching the target plane and the number of ring-like facets for converging light to reach the target plane before crossing the optical axis are substantially equal.

4. The Fresnel lens of claim 1, wherein the lens is polygonal shaped.

5. The Fresnel lens of claim 1, wherein the lens is square.

6. The Fresnel lens of claim 1, wherein the target is a photoelectric cell.

7. The Fresnel lens of claim 1 designed for converging light onto a target plane that is flat.

8. The Fresnel lens of claim 7, wherein the number of ring-like facets for converging light to reach the target plane before crossing the optical axis is greater than the number of said ring-like facets for converging light to cross the optical axis before reaching the target plane, to compensate for the differences in angularity of the rays respective to said target plane.

9. The Fresnel lens of claim 1 wherein said ring-like areas of said target plane are contiguous.

10. The Fresnel lens of claim 1 wherein the first ring-like target area has a negligible interior radius.

* * * * *